(12) United States Patent
Ma et al.

(10) Patent No.: US 11,979,590 B2
(45) Date of Patent: May 7, 2024

(54) SYSTEMS AND METHODS FOR PREDICTING FUTURE DATA USING DIVERSE SAMPLING

(71) Applicant: Honda Motor Co., Ltd., Tokyo (JP)

(72) Inventors: Hengbo Ma, Albany, CA (US); Chiho Choi, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/721,310

(22) Filed: Apr. 14, 2022

(65) Prior Publication Data

US 2023/0148102 A1     May 11, 2023

Related U.S. Application Data

(60) Provisional application No. 63/278,036, filed on Nov. 10, 2021.

(51) Int. Cl.
*H04N 19/42* (2014.01)
*G06N 3/04* (2023.01)
(Continued)

(52) U.S. Cl.
CPC ............. *H04N 19/42* (2014.11); *G06N 3/044* (2023.01); *G06N 3/048* (2023.01); *G06N 3/08* (2013.01);
(Continued)

(58) Field of Classification Search
CPC .... H04N 19/42; H04N 19/103; H04N 19/132; H04N 19/172; H04N 19/50; G06N 3/048; G06N 3/044; G06N 3/08
See application file for complete search history.

(56) References Cited

U.S. PATENT DOCUMENTS

| | | | |
|---|---|---|---|
| 2008/0291995 A1* | 11/2008 | Graham | H04N 19/156 375/E7.137 |
| 2014/0324249 A1* | 10/2014 | Lacaze | G05D 1/0038 701/2 |

(Continued)

FOREIGN PATENT DOCUMENTS

| | | | |
|---|---|---|---|
| CN | 105791829 | * | 3/2016 |
| CN | 113888588 A | * | 9/2021 |
| CN | 113888588 A | * | 9/2021 |

OTHER PUBLICATIONS

Yin, Bai-cheng, Translation of CN 113888588 A, Sep. 2021 (Year: 2021).*

(Continued)

*Primary Examiner* — Zaihan Jiang
(74) *Attorney, Agent, or Firm* — RANKIN, HILL & CLARK LLP

(57) ABSTRACT

Systems and methods for providing a framework for predicting future frames using diverse sampling are provided. In one embodiment, a method for predicting future frames includes receiving a video having a first frame from a first time and a second frame from a second time. The first frame and the second frame are represented in image space. The method also includes updating a prediction model based on the video. The method further includes determining whether a stopping condition is satisfied. In response to determining that the stopping condition has been satisfied, the method includes generating a plurality of future frames for a third time after the second time. The plurality of future frames is generated based on a normalized distance metric that preserves distance of samples in the latent space to the image space. The method yet further includes selecting a candidate frame from the plurality of future frames.

20 Claims, 8 Drawing Sheets

(51) Int. Cl.

| | |
|---|---|
| *G06N 3/044* | (2023.01) |
| *G06N 3/048* | (2023.01) |
| *G06N 3/08* | (2023.01) |
| *H04N 19/103* | (2014.01) |
| *H04N 19/132* | (2014.01) |
| *H04N 19/172* | (2014.01) |
| *H04N 19/50* | (2014.01) |

(52) U.S. Cl.
CPC ......... *H04N 19/103* (2014.11); *H04N 19/132* (2014.11); *H04N 19/172* (2014.11); *H04N 19/50* (2014.11)

(56) References Cited

U.S. PATENT DOCUMENTS

| | | | |
|---|---|---|---|
| 2020/0304802 A1* | 9/2020 | Habibian | G06F 18/21 |
| 2020/0326769 A1* | 10/2020 | Ansari | G09G 3/20 |
| 2021/0271926 A1* | 9/2021 | Esaki | G06V 10/82 |
| 2022/0050454 A1* | 2/2022 | Lacaze | G05D 1/0212 |
| 2022/0128989 A1* | 4/2022 | Ghorbanian-Matloob | H04N 7/181 |

OTHER PUBLICATIONS

Hu, Translation of CN 105791829, Mar. 2016 (Year: 2016).*

Mohammad Babaeizadeh, Chelsea Finn, Dumitru Erhan, Roy H Campbell, and Sergey Levine. Stochastic variational video prediction. arXiv preprint arXiv:1710.11252, 2017.

Apratim Bhattacharyya, Bernt Schiele, and Mario Fritz. Accurate and diverse sampling of sequences based on a "best of many" sample objective. In Proceedings of the IEEE Conference on Computer Vision and Pattern Recognition, pp. 8485-8493, 2018.

Samuel R Bowman, Luke Vilnis, Oriol Vinyals, Andrew M Dai, Rafal Jozefowicz, and Samy Bengio. Generating sentences from a continuous space. arXiv preprint arXiv:1511.06349, 2015.

Haoye Cai, Chunyan Bai, Yu-Wing Tai, and Chi-Keung Tang. Deep video generation, prediction and completion of human action sequences. In Proceedings of the European Conference on Computer Vision (ECCV), pp. 366-382, 2018.

Lluis Castrejon, Nicolas Ballas, and Aaron Courville. Improved conditional vrnns for video prediction. In Proceedings of the IEEE/CVF International Conference on Computer Vision, pp. 7608-7617, 2019.

Xiaohui Chen, Ramtin Hosseini, Karen Panetta, and Jivko Sinapov. A framework for multisensory foresight for embodied agents. In 2021 IEEE International Conference on Robotics and Automation (ICRA), pp. 10927-10933. IEEE, 2021.

Xi Chen, Diederik P Kingma, Tim Salimans, Yan Duan, Prafulla Dhariwal, John Schulman, Ilya Sutskever, and Pieter Abbeel. Variational lossy autoencoder. arXiv preprint arXiv:1611.02731, 2016.

Emily Denton and Rob Fergus. Stochastic video generation with a learned prior. In International Conference on Machine Learning, pp. 1174-1183. PMLR, 2018.

Alexey Dosovitskiy and Thomas Brox. Generating images with perceptual similarity metrics based on deep networks. Advances in neural information processing systems, 29:658-666, 2016.

Yilun Du and Igor Mordatch. Implicit generation and generalization in energy-based models. arXiv preprint arXiv:1903.08689, 2019.

Frederik Ebert, Chelsea Finn, Alex X Lee, and Sergey Levine. Self-supervised visual planning with temporal skip connections. In CoRL, pp. 344-356, 2017.

Chelsea Finn, Ian Goodfellow, and Sergey Levine. Unsupervised learning for physical interaction through video prediction. Advances in neural information processing systems, 29:64-72, 2016.

Hao Fu, Chunyuan Li, Xiaodong Liu, Jianfeng Gao, Asli Celikyilmaz, and Lawrence Carin. Cyclical annealing schedule: A simple approach to mitigating kl vanishing. arXiv preprint arXiv:1903.10145, 2019.

Ian Goodfellow, Jean Pouget-Abadie, Mehdi Mirza, Bing Xu, DavidWarde-Farley, Sherjil Ozair, Aaron Courville, and Yoshua Bengio. Generative adversarial nets. Advances in neural information processing systems, 27, 2014.

Junxian He, Daniel Spokoyny, Graham Neubig, and Taylor Berg-Kirkpatrick. Lagging inference networks and posterior collapse in variational autoencoders. arXiv preprint arXiv:1901.05534, 2019.

Sepp Hochreiter and Jürgen Schmidhuber. Long short-term memory. Neural computation, 9(8):1735-1780, 1997.

Matthew D Hoffman and Matthew J Johnson. Elbo surgery: yet another way to carve up the variational evidence lower bound. In Workshop in Advances in Approximate Bayesian Inference, NIPS, vol. 1, 2016.

Zhihang Hu and Jason Wang. A novel adversarial inference framework for video prediction with action control. In Proceedings of the IEEE/CVF International Conference on Computer Vision Workshops, pp. 0-0, 2019.

Catalin Ionescu, Dragos Papava, Vlad Olaru, and Cristian Sminchisescu. Human3.6m: Large scale datasets and predictive methods for 3d human sensing in natural environments. IEEE transactions on pattern analysis and machine Intelligence, 36(7):1325-1339, 2013.

Phillip Isola, Jun-Yan Zhu, Tinghui Zhou, and Alexei A Efros. Image-to-image translation with conditional adversarial networks. In Proceedings of the IEEE conference on computer vision and pattern recognition, pp. 1125-1134, 2017.

Justin Johnson, Alexandre Alahi, and Li Fei-Fei. Perceptual losses for real-time style transfer and super-resolution. In European conference on computer vision, pp. 694-711. Springer, 2016.

Durk P Kingma, Tim Salimans, Rafal Jozefowicz, Xi Chen, Ilya Sutskever, and Max Welling. Improved variational Inference with inverse autoregressive flow. Advances in neural information processing systems, 29:4743-4751, 2016.

Diederik P Kingma and Max Welling. Auto-encoding variational bayes. arXiv preprint arXiv:1312.6114, 2013.

Hema Swetha Koppula and Ashutosh Saxena. Anticipating human activities for reactive robotic response. In IROS, p. 2071. Tokyo, 2013.

Manoj Kumar, Mohammad Babaeizadeh, Dumitru Erhan, Chelsea Finn, Sergey Levine, Laurent Dinh, and Durk Kingma. Videoflow: A conditional flow-based model for stochastic video generation. arXiv preprint arXiv:1903.01434, 2019.

Alex X Lee, Richard Zhang, Frederik Ebert, Pieter Abbeel, Chelsea Finn, and Sergey Levine. Stochastic adversarial video prediction. arXiv preprint arXiv:1804.01523, 2018.

Chaochao Lu, Michael Hirsch, and Bernhard Scholkopf. Flexible spatio-temporal networks for video prediction. In Proceedings of the IEEE Conference on Computer Vision and Pattern Recognition, pp. 6523-6531, 2017.

James Lucas, George Tucker, Roger B Grosse, and Mohammad Norouzi. Don't blame the elbo! a linear vae perspective on posterior collapse. Advances in Neural Information Processing Systems, 32:9408-9418, 2019.

Michael Mathieu, Camille Couprie, and Yann LeCun. Deep multi-scale video prediction beyond mean square error. arXiv preprint arXiv:1511.05440, 2015.

Brian Paden, Michal Čáp, Sze Zheng Yong, Dmitry Yershov, and Emilio Frazzoli. A survey of motion planning and control techniques for self-driving urban vehicles. IEEE Transactions on intelligent vehicles, 1(1):33-55, 2016.

Masaki Saito, Eiichi Matsumoto, and Shunta Saito. Temporal generative adversarial nets with singular value clipping. In Proceedings of the IEEE international conference on computer vision, pp. 2830-2839, 2017.

Tim Salimans, Ian Goodfellow, Wojciech Zaremba, Vicki Cheung, Alec Radford, and Xi Chen. Improved techniques for training gans. Advances in neural information processing systems, 29:2234-2242, 2016.

Christian Schuldt, Ivan Laptev, and Barbara Caputo. Recognizing human actions: a local svm approach. In Proceedings of the 17th International Conference on Pattern Recognition, 2004. ICPR 2004., vol. 3, pp. 32-36. IEEE, 2004.

Gaurav Shrivastava and Abhinav Shrivastava. Diverse video generation using a gaussian process trigger. arXiv preprint arXiv:2107.04619, 2021.

(56) References Cited

OTHER PUBLICATIONS

Karen Simonyan and Andrew Zisserman. Very deep convolutional networks for large-scale image recognition. arXiv preprint arXiv:1409.1556, 2014.

Khurram Soomro, Amir Roshan Zamir, and Mubarak Shah. Ucf101: A dataset of 101 human actions classes from videos in the wild. arXiv preprint arXiv:1212.0402, 2012.

Nitish Srivastava, Elman Mansimov, and Ruslan Salakhudinov. Unsupervised learning of video representations using stms. In International conference on machine learning, pp. 843-852. PMLR, 2015.

Gyan Tatiya, Ramtin Hosseini, Michael C Hughes, and Jivko Sinapov. A framework for sensorimotor cross-perception and cross-behavior knowledge transfer for object categorization. Frontiers in Robotics and AI, 7:137, 2020.

Sergey Tulyakov, Ming-Yu Liu, Xiaodong Yang, and Jan Kautz. Mocogan: Decomposing motion and content for video generation. In Proceedings of the IEEE conference on computer vision and pattern recognition, pp. 1526-1535, 2018.

Thomas Unterthiner, Sjoerd van Steenkiste, Karol Kurach, Raphael Marinier, Marcin Michalski, and Sylvain Gelly. Towards accurate generative models of video: A new metric & challenges. arXiv preprint arXiv:1812.01717, 2018.

Ruben Villegas, Dumitru Erhan, Honglak Lee, et al. Hierarchical long-term video prediction without supervision. In International Conference on Machine Learning, pp. 6038-6046. PMLR, 2018.

Ruben Villegas, Jimei Yang, Yuliang Zou, Sungryull Sohn, Xunyu Lin, and Honglak Lee. Learning to generate longterm future via hierarchical prediction. In international conference on machine learning, pp. 3560-3569. PMLR, 2017.

Carl Vondrick, Hamed Pirsiavash, and Antonio Torralba. Generating videos with scene dynamics. Advances in neural Information processing systems, 29:613-621, 2016.

Carl Vondrick and Antonio Torralba. Generating the future with adversarial transformers. In Proceedings of the IEEE Conference on Computer Vision and Pattern Recognition, pp. 1020-1028, 2017.

Jacob Walker, Kenneth Marino, Abhinav Gupta, and Martial Hebert. The pose knows: Video forecasting by generating bose futures. In Proceedings of the IEEE international conference on computer vision, pp. 3332-3341, 2017.

Christopher K Williams and Carl Edward Rasmussen. Gaussian processes for machine learning, vol. 2. MIT press Cambridge, MA, 2006.

Tianfan Xue, Jiajun Wu, Katherine L Bouman, and William T Freeman. Visual dynamics: Probabilistic future frame synthesis via cross convolutional networks. arXivpreprint arXiv:1607.02586, 2016.

Ye Yuan and Kris Kitani. Dlow: Diversifying latent flows for diverse human motion prediction. In European Conference on Computer Vision, pp. 346-364. Springer, 2020.

Richard Zhang, Phillip Isola, Alexei A Efros, Eli Shechtman, and Oliver Wang. The unreasonable effectiveness of deep features as a perceptual metric. In Proceedings of the IEEE conference on computer vision and pattern recognition, pp. 586-595, 2018.

He Zhao and Richard P Wildes. On diverse asynchronous activity anticipation. In European Conference on Computer Vision, pp. 781-799. Springer, 2020.

Jun-Yan Zhu, Richard Zhang, Deepak Pathak, Trevor Darrell, Alexei A Efros, OliverWang, and Eli Shechtman. Multimodal image-to-image translation by enforcing bi-cycle consistency. In Advances in neural information processing systems, pp. 465-476, 2017.

\* cited by examiner

SYSTEMS AND METHODS FOR PREDICTING FUTURE DATA USING DIVERSE SAMPLING

BACKGROUND

Modeling and predicting diverse future datasets have many useful applications in human robot interaction and autonomous vehicles, but also present challenging problems in computer vision. These challenges are two-fold. Firstly, it is difficult to model the spatio-temporal coherency between consecutive datasets. Secondly, it is difficult to forecast a diverse set of scenarios rather than only the most plausible one. For instance, when an autonomous vehicle is approaching a junction, the autonomous vehicle considers the behavior of other proximate vehicles, such as whether a proximate vehicle may turn in different directions. The autonomous vehicle may use deep learning to predict the behavior of the proximate vehicles. However, prior work has demonstrated that training deep learning models usually suffers from "posterior collapse," which results in lack of diversity in predictions.

BRIEF DESCRIPTION

According to one aspect, a computer-implemented method for predicting future data using diverse sampling is provided. The method includes receiving a video having a first frame from a first time and a second frame from a second time after the first time. The first frame and the second frame are represented in image space. The method also includes updating a prediction model based on the video. The method further includes determining whether a stopping condition is satisfied. In response to determining that the stopping condition has been satisfied, the method includes generating a plurality of future frames for a third time after the second time. The plurality of future frames is generated based on a normalized distance metric that preserves distance of samples in the latent space to the image space. The method further includes selecting a candidate frame from the plurality of future frames.

According to another aspect, a system for predicting future data using diverse sampling is provided. The system includes a processor and a memory storing instructions that when executed by the processor cause the processor to perform a method. The method includes receiving a video having a first frame from a first time and a second frame from a second time after the first time. The first frame and the second frame are represented in image space. The method also includes updating a prediction model based on the video. The method further includes determining whether a stopping condition is satisfied. In response to determining that the stopping condition has been satisfied, the method includes generating a plurality of future frames for a third time after the second time. The plurality of future frames is generated based on a normalized distance metric that preserves distance of samples in the latent space to the image space. The method further includes selecting a candidate frame from the plurality of future frames.

According to a further aspect, a non-transitory computer readable storage medium storing instructions that when executed by a computer having a processor to perform a method for predicting future data using diverse sampling is provided. The method includes receiving a video having a first frame from a first time and a second frame from a second time after the first time. The first frame and the second frame are represented in image space. The method also includes updating a prediction model based on the video. The method further includes determining whether a stopping condition is satisfied. In response to determining that the stopping condition has been satisfied, the method includes generating a plurality of future frames for a third time after the second time. The plurality of future frames is generated based on a normalized distance metric that preserves distance of samples in the latent space to the image space. The method further includes selecting a candidate frame from the plurality of future frames.

DETAILED DESCRIPTION

Figure 1:
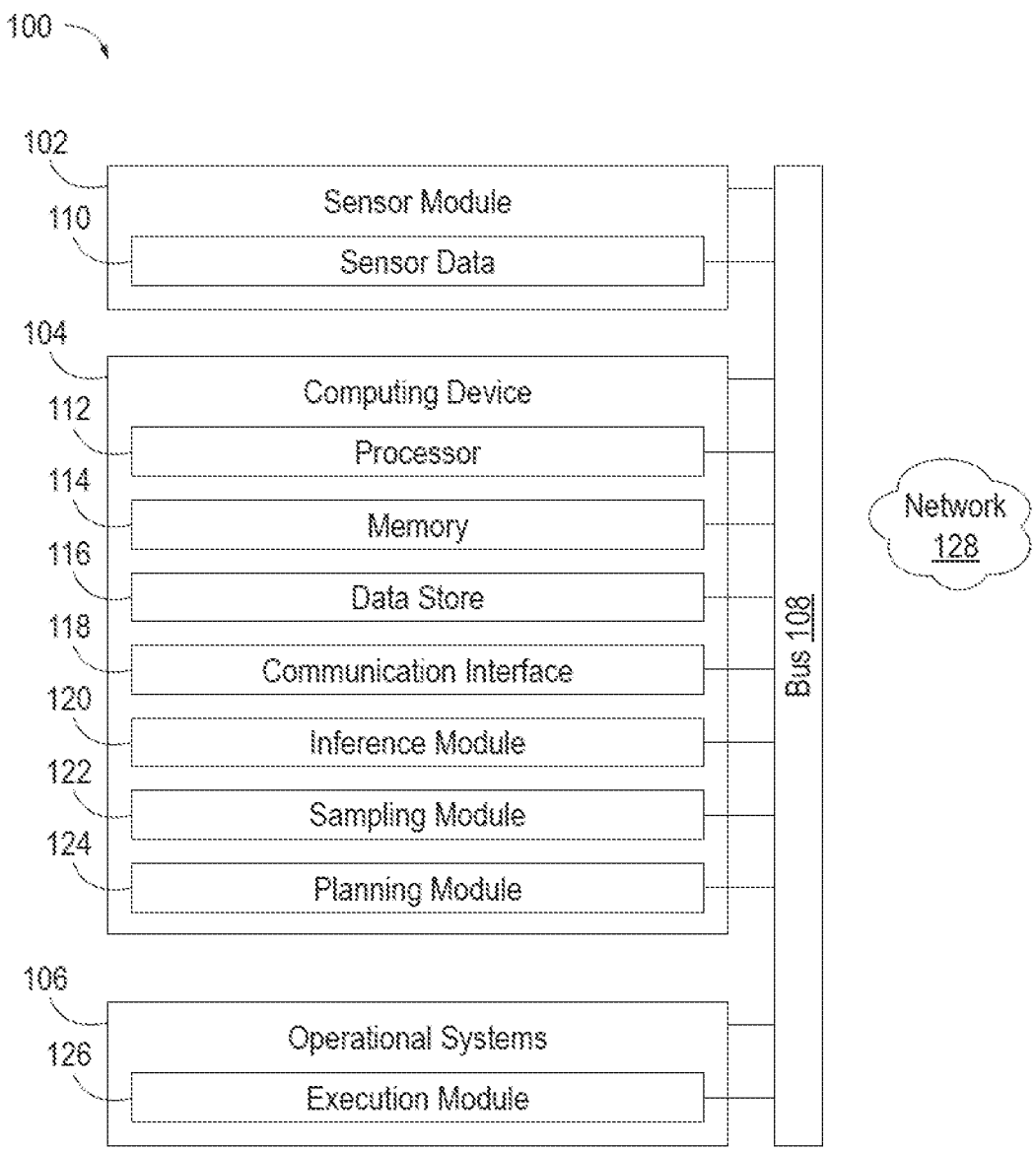
FIG. 1 is a schematic view of an exemplary operating environment for implementing systems and methods for predicting future data using diverse sampling according to an exemplary embodiment.

The present disclosure provides a framework for predicting future data using diverse sampling in two stages. In the first stage, an inference module including a frame autoencoder and a dynamics encoder is deployed to generate a plurality of future frames. The frame autoencoder encodes a frame into a dense latent representation and using it to produce the original frame back. The dynamics encoder models the dynamics between previous and subsequent frames. In this stage, the posterior collapse problem is determined from the perspective of training dynamics. The posterior approximation may often lag far behind the true model posterior such that the optimization of the inference and generation networks are imbalanced. To overcome this problem, the frame auto encoder is aggressively optimized in the inference network with more updates to reduce this lag.

In the second stage, once the generative model is learned, a sampling strategy is used to produce a plurality of future frames to overcome a lack of diversity. Typically, samples of data from the learned latent codes and decode them into frame samples. This sampling strategy is not guaranteed to generate diverse samples for two reasons. Firstly, the samples are drawn independently. Secondly, the samples are drawn based on the most likelihood mode which causes they less cover minor modes. As this sampling strategy is inefficient, most existing methods draw a large number of samples in order to cover all the modes in the data distribution which is computationally prohibitive and inappropriate for safety-critical application like autonomous vehicles. Here, a sampling module preserves the normalized pairwise sample distance in the latent space to remain in the output space. To compromise a balance between diversity and likelihood, a divergence term may be added to the objective function to enhance the likelihood of each sample. The relative weights between the prior term and the divergence term shows the trade-off between the diversity and likelihood of the generated frame samples Definitions The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein are machines that move through or manipulate an environment. Exemplary agents may include, but is not limited to, robots, vehicles, or other self-propelled machines. The agent may be autonomously, semi-autonomously, or manually operated.

"Agent system," as used herein may include, but is not limited to, any automatic or manual systems that may be used to enhance the agent, propulsion, and/or safety. Exemplary systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pretensioning system, a monitoring system, a passenger detection system, a suspension system, a seat configuration system, a cabin lighting system, an audio system, a sensory system, an interior or exterior camera system among others.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

The terms "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several sources.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. Further, the term "vehicle" may refer to an electric vehicle (EV) that is powered entirely or partially by one or more electric motors powered by an electric battery. The EV may include battery electric vehicles and plug-in hybrid electric vehicles (PHEV). The term "vehicle" may also refer to an autonomous vehicle and/or self-driving vehicle powered by any form of energy.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, a vehicle-to-everything (V2X) communication system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

I. System Overview

Referring now to the drawings, the drawings are for purposes of illustrating one or more exemplary embodiments and not for purposes of limiting the same. FIG. 1 is an exemplary component diagram of an operating environment 100 for predicting future data using diverse sampling is provided. The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

Figure 2:
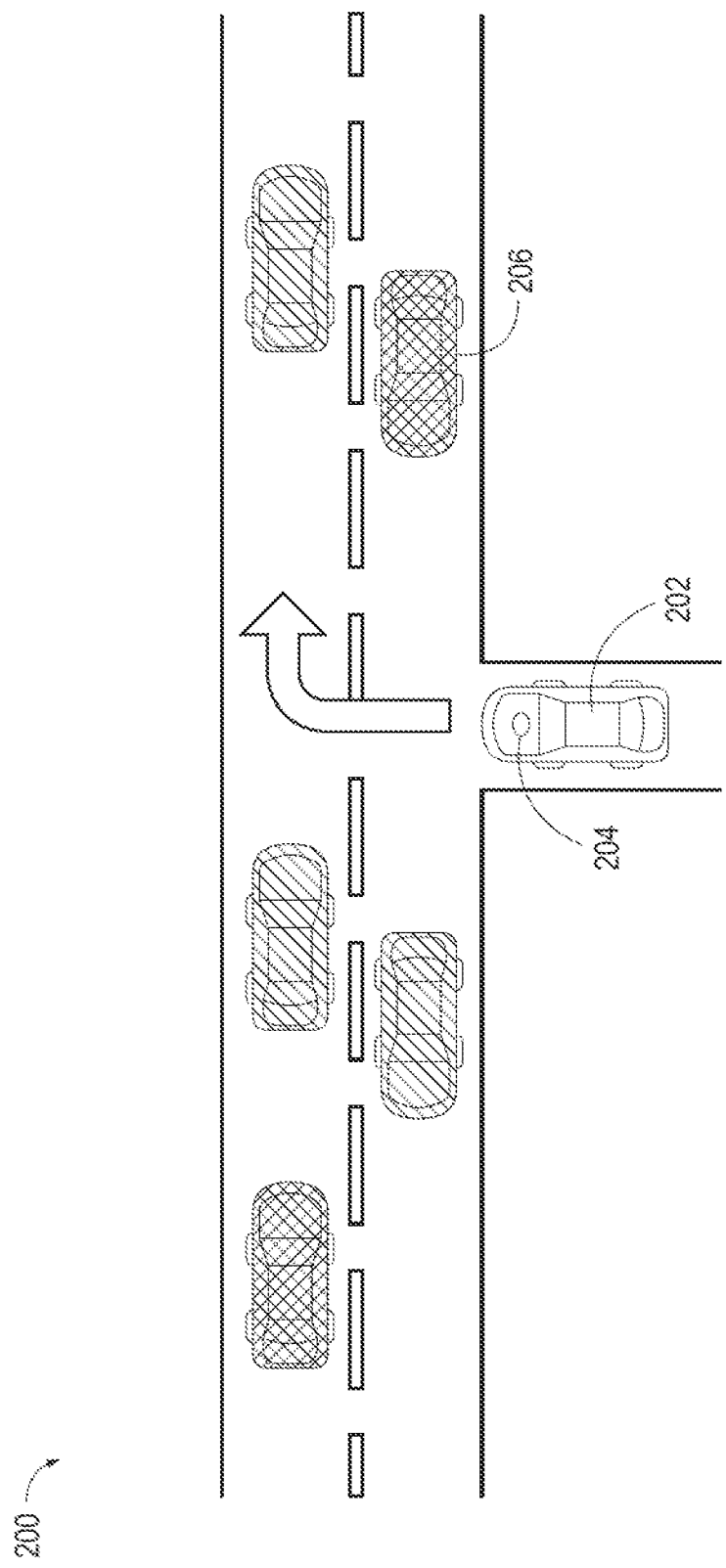
FIG. 2 is an illustrative example of a scene for predicting future data using diverse sampling according to an exemplary embodiment.

The computing device 104 may be implemented as a part of an agent, such as the host agent 202 of the roadway 200, shown in FIG. 2. The host agent 202 may be a bipedal, two-wheeled or four-wheeled robot, a vehicle, or a self-propelled machine. For example, in another embodiment, the host agent 202 may be configured as a humanoid robot. The host agent 202 may take the form of all or a portion of a robot. The computing device 104 may be implemented as part of a telematics unit, a head unit, a navigation unit, an infotainment unit, an electronic control unit, among others of the host agent 202. In other embodiments, the components and functions of the computing device 104 may be implemented with other devices (e.g., a portable device) or another device connected via a network (e.g., a network 128).

The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment 100.

The host agent 202 may include sensors for sensing objects and the roadway 200. For example, the host agent 202 may include an image sensor 204. The image sensor 204 may be a light sensor to capture light data from around the host agent 202. For example, a light sensor may rotate 360 degrees around host agent 202 and collect the sensor data 110 in sweeps. Conversely, an image sensor 204 may be omnidirectional and collect sensor data 110 from all directions simultaneously. The image sensor 204 of an agent may emit one or more laser beams of ultraviolet, visible, or near infrared light toward the surrounding environment of the host agent 202. In some embodiments, the image sensor 204 may be a monocular camera.

The image sensor 204 may positioned on the host agent 202. For example, suppose that the host agent 202 is a vehicle. One or more sensors may be positioned at external front and/or side portions of the host agent 202, including, but not limited to different portions of the vehicle bumper, vehicle front lighting units, vehicle fenders, and the windshield. Additionally, the sensors may be disposed at internal portions of the host agent 202 including, in a vehicular embodiment, the vehicle dashboard (e.g., dash mounted camera), rear side of a vehicle rear view mirror, etc. Sensors may be positioned on a planar sweep pedestal (not shown) that allows the image sensor 204 to be rotated to capture images of the environment at various angles.

The image sensor 204 is associated with intrinsic parameters. The intrinsic parameters link the pixel coordinates of an image in the image space with corresponding coordinates in the camera reference frame. The intrinsic parameters identify the transformation between the camera reference frame and an output space, such as the world reference frame. For example, the intrinsic parameters may include the position, angle, field of view (FOV), location, etc. of the image sensor 204, the size of pixels in the image, and the orientation of the image sensor 204, among others.

Accordingly, the sensors, such as the image sensor 204, and/or the sensor module 102 are operable to sense a measurement of data associated with the host agent 202, the operating environment 100, the roadway 200, a proximate agent 206, and/or the operational systems 106 and generate a data signal indicating said measurement of data. These data signals may be converted into other data formats (e.g., numerical) and/or used by the sensor module 102, the computing device 104, and/or the operational systems 106 to generate sensor data 110 including data metrics and parameters. The sensor data 110 may be received by the sensor module 102 as a video including a series of images represented as sequential frames. For example, a first frame of a video may be an image of the roadway 200 at a first time and a second frame of the video may be an image of the roadway 200 at a second time following the first time in an increment of a timestep.

The computing device 104 includes a processor 112, a memory 114, a data store 116, and a communication interface 118, which are each operably connected for computer communication via a bus 108 and/or other wired and wireless technologies. The communication interface 118 provides software and hardware to facilitate data input and output between the components of the computing device 104 and other components, networks, and data sources, which will be described herein. Additionally, the computing device 104 also includes an inference module 120, a sampling module 122, and a planning module 124 for predicting future data using diverse sampling facilitated by the components of the operating environment 100.

The inference module 120, the sampling module 122, and the planning module 124 may be artificial neural networks that act as a framework for machine learning, including deep reinforcement learning. For example, the inference module 120, the sampling module 122, and the planning module 124 may be a convolution neural network (CNN). In one embodiment, the inference module 120, the sampling module 122, and the planning module 124 may include a probabilistic graphical model such as a variational autoencoder (VAE) or a conditional generative adversarial network (cGAN). In some embodiments, inference module 120, the sampling module 122, and the planning module 124 may utilize a trained using a dataset that include training images. The training images may include a plurality of frames from the image sensor 204, such as the video. The plurality of frames may be annotated with labels. The training images may also be annotated with classes are populated by attributes associated with environmental characteristics.

One or more of the inference module 120, the sampling module 122, and the planning module 124 may be a graphical representation neural network that is applied to graphical representation structures. In another embodiment, the inference module 120, the sampling module 122, and the planning module 124 may include an input layer, an output layer, and one or more hidden layers, which may be convolutional filters. In some embodiments, one or more of the modules may include Long Short-Term Memory (LSTM) networks and LSTM variants (e.g., E-LSTM, G-LSTM, etc.).

The computing device 104 is also operably connected for computer communication (e.g., via the bus 108 and/or the communication interface 118) to one or more operational systems 106. The operational systems 106 may include, but are not limited to, any automatic or manual systems that may be used to enhance the host agent 202, operation, and/or safety. For example, in a vehicular embodiment, the operational systems 106 may include one or more vehicle systems.

The operational systems 106 include an execution module 126. The execution module 126 monitors, analyses, and/or operates the host agent 202, to some degree. For example, the execution module 126 may store, calculate, and provide directional information and facilitate features like vectoring and obstacle avoidance among others. In a vehicular embodiment, the execution module 126 may provide operational data to vehicle systems, such as the steering system, that cause the host agent 202 to operate autonomously. In some embodiments, the execution module 126 may be a Proportional, Integral, Derivative (PID) controller. Continuing the vehicular embodiment described above, the execution module 126 may be a longitudinal PID controller. The operational systems 106 may be dependent on the implementation.

The operational systems 106 also include and/or are operably connected for computer communication to the sensor module 102. For example, one or more sensors of the sensor module 102, such as the image sensor 204, may be incorporated with execution module 126 to monitor characteristics of the environment of the host agent 202 or the host agent 202 itself. In the vehicular embodiment, the image sensor 204 may be incorporated with execution module 126 to monitor characteristics of the roadway 200. Suppose that the execution module 126 is facilitating execution of a right turn onto a street. The execution module 126 may receive sensor data 110 from the sensor module 102 to confirm that vehicles present on the street are yielding as expected.

The sensor module 102, the computing device 104, and/or the operational systems 106 are also operatively connected for computer communication to the network 128. The network 128 is, for example, a data network, the Internet, a wide area network (WAN) or a local area (LAN) network. The network 128 serves as a communication medium to various remote devices (e.g., databases, web servers, remote servers, application servers, intermediary servers, client machines, other portable devices). Detailed embodiments describing exemplary methods using the system and network configuration discussed above will now be discussed in detail.

II. Methods for Predicting Future Frames

Figure 3:
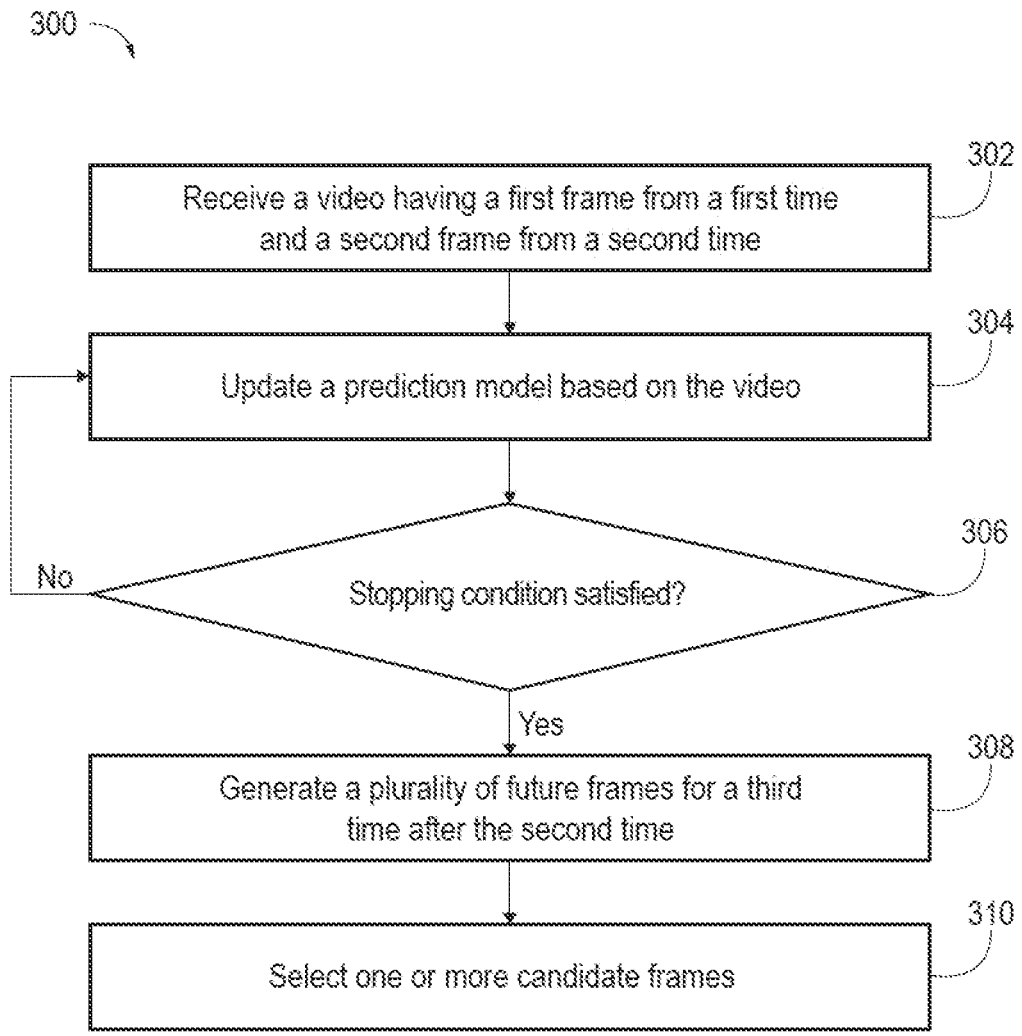
FIG. 3 is a process flow diagram of a method for implementing systems and methods for predicting future data using diverse sampling according to an exemplary embodiment.

Referring now to FIG. 3, a method 300 for predicting future data using diverse sampling will now be described according to an exemplary embodiment. FIG. 3 will also be described with reference to FIGS. 1, 2, and 4-7. For simplicity, the method 300 will be described as a sequence of blocks, but it is understood that the blocks of the method 300 may be organized into different architectures, blocks, stages, and/or processes.

At block 302, the method 300 includes the inference module 120 receiving a video having a series of sequential frames including a first frame from a first time and a second frame from a second time after the first time. The first frame and the second frame are represented in image space. The image space for a time t is denoted by $x_t \in R^{H \times W}$ in which H and W denote height and width of the input respectively.

While, the video, and corresponding examples, will be described with respect to a first frame and second frame for clarity, more frames may be used in the in the systems and methods herein. For example, a video may include 24 frames per second. The systems and methods described herein may use any number of frames and/or frames at different time steps, such as one frame every six milliseconds for six minutes. The number of frames of the video may be determined based on the frame rate of the video or the characteristics of the image sensor 204.

Figure 4A:
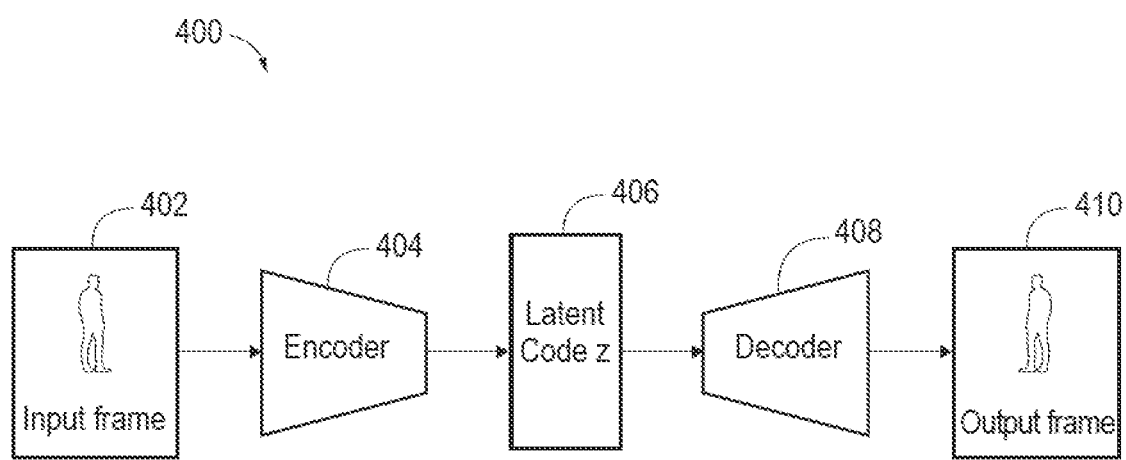
FIG. 4A is an example prediction model architecture according to an exemplary embodiment.

The inference module 120 may include a prediction model architecture, as shown in FIG. 4A. The prediction model architecture 400 may receive an input image 402 from the image sensor 204, and/or the sensor module 102 of the physical environment of the host agent 202 including the roadway 200 and proximate vehicles, such as the proximate agent 206. The input image 402 may be the first frame of a video received from the image sensor 204. In another embodiment, the input image may be a training image from a different agent. For example, the host agent 202 may be trained based on images received from an image sensor of the proximate agent 206, the operates in a similar manner as the image sensor 204 discussed above.

At block 304, the method 300 includes updating a prediction model based on the video in a training stage. The inference module 120 may include a prediction model architecture, as shown in FIG. 4A. The prediction model architecture 400 may receive the input image 402 at a frame prediction autoencoder 404 such as a variational auto encoder (VAE). The frame prediction autoencoder 404 may include pooling layers replaced with spatial up-sampling, a sigmoid output layer, and skip connections from the frame prediction autoencoder 404 in order to reconstruct the input image 402. The frame prediction autoencoder 404 may also include LSTMs to capture sequential changes of frames with their temporal coherence. Accordingly, the inference module 120 may include a fully-connected layer, followed by two LSTM layers, and an output fully-connected layer.

The updating the prediction model is based on a given latent code 406 for a first sample i, based on the first frame or the second frame, at a time step t, such as the first time or the second time respectively, such that a latent codes 406 is denoted by $z_t^i$. Therefore, if the input image 402 may initially include the first frame or a second frame is given by a set of data denoted as X, then the input image 402 at the time step t is given by $x_t \in X$. The optimization of the frame prediction autoencoder 404 is given by:

$$\theta^* = \underset{\theta}{\mathrm{argmax}} L(x; \theta, \phi^*)$$

where $\phi^* = \mathrm{argmax}_\phi L(x; \theta, \phi)$. $\theta$ is the true model posterior and is approximate model posterior.

At block 306, the method 300 includes determining if a stopping condition is satisfied. If the stopping condition is not satisfied, the method 300 returns to block 304 and the inference module 120 continues optimizing the frame prediction model. In this manner, the frame prediction autoencoder 404 is repeatedly trained in a nested loop until a stopping condition is satisfied. For example, rather than training the frame prediction autoencoder 404 once on based on the input image 402, the frame prediction autoencoder 404 is repeatedly trained based on plurality of frames of the video until the stopping condition is satisfied.

In each iteration of the nested loop, the frame prediction autoencoder 404 is followed by the decoder 408. During the training stage, the encoded-decoded output image 410 is compared with the input image 402 and backpropagate the error through the prediction model architecture 400 to update the weights of the networks.

Thus, during the updating of the prediction model, the prediction model may receive learning model parameters in a slower manner since optimizing the inference model $q_\phi(z|x)$ is a nested loop in the training stage. The stopping condition is defined so that the approximate model posterior does not collapse to the prior ($q_\phi(z|x) \approx p(z)$).

When the stopping condition is met, the frame prediction model stops aggressively updating and the inference module 120 may initiate a different training. For example, the frame prediction model may undergo a standard training as the different training. The standard training may cause the frame prediction model to receive learning model parameters in a faster manner than the aggressive training used to update the frame prediction model. Therefore, the stopping condition may revert from the aggressive training to the standard training to reduce the lag experienced by the frame prediction autoencoder 404. In this manner, the frame prediction autoencoder 404 may be utilized with lagging with the sequential data of the video.

The stopping condition is based on mutual information $I_q$ between z and x under $q_\phi(z|x)$, which may be calculated as:

$I_q = \mathbb{E}_{x \sim p_d}[D_{KL}(q_\phi(z|x)\|p(z))] - D_{KL}(q_\phi(z)\|p(z))$ where $p_d(x)$ is the empirical distribution. The total loss function for training our frame prediction $$L_T = \sum_{t=1}^{T}(\lambda_1 L_{gen}(x_t, \hat{x}_t) + \lambda_2 L_{gen}(x_t, f_{gen}(\hat{z}_t)) + \lambda_3 L_{LSTM}(z_{t+1}, \hat{z}_{t+1}))$$

Here, the first term corresponds to the frame prediction generation loss, i.e., $L_{gen}(x_t, \hat{x}_t) = \|x_t - \hat{x}_t\|^2$, the second term corresponds to LSTM frame generation loss, i.e., $L_{gen}(x_t, f_{gen}(\hat{z}_t)) = \|x_t - f_{gen}(\hat{z}_t)\|^2$, and the third term corresponds to LSTM encoder loss, i.e., $L_{LSTM} = \|z_{t+1} - \hat{z}_{t+1}\|^2$, where T is the total number of frames. Moreover, $\lambda_1, \lambda_2, \lambda_3$ are hyper-parameters.

If, at block 306, the method 300, the inference module 120 determines that the stopping condition is satisfied, the method proceeds to block 308. At block 308, the method 300 includes generating a plurality of future frames for a third time after the second time based on the sampling architecture 420, shown in FIG. 4B, in a sampling stage. The frame prediction at a future time, such as the third time, for the sample i is then given by $\hat{x}_t^i$.

Figure 4B:
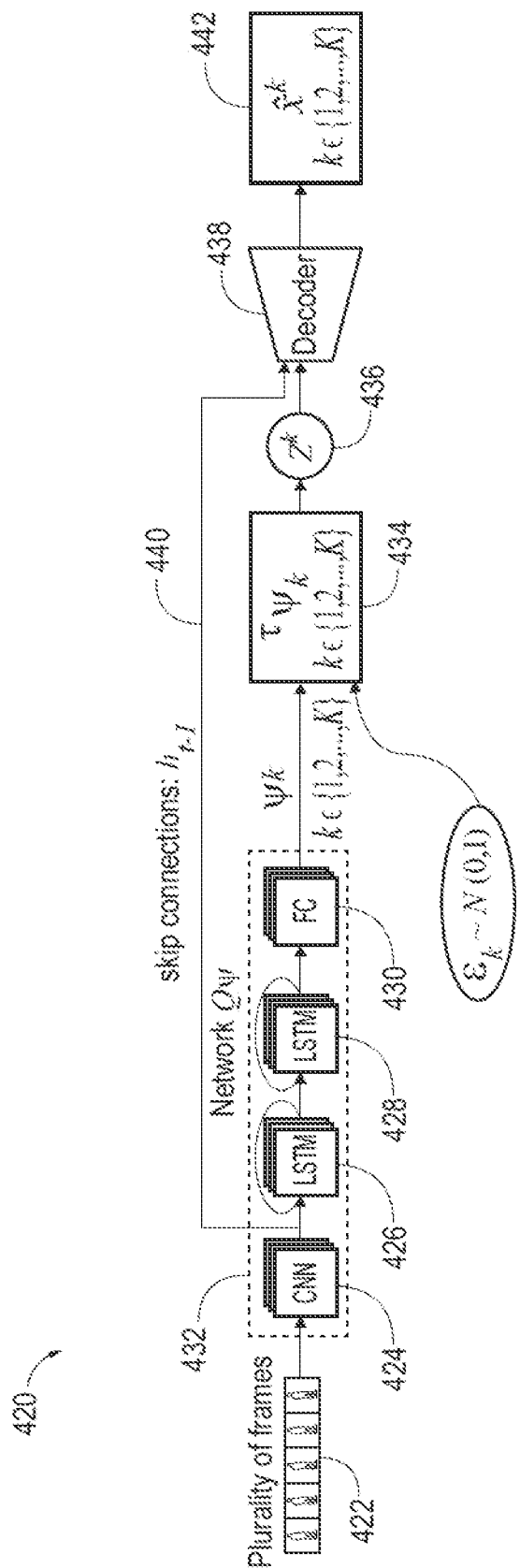
FIG. 4B is an example sampler architecture according to an exemplary embodiment.

The sampling module 122 utilizes a sampling architecture 420 shown in FIG. 4B. The input to sampling architecture 420 is the video including a plurality of frames 422. The sampling encoder 432 of the sampling architecture 420 includes a convolution layer 424, a first LSTM layer 426, a second LSTM 428, and a meridian lossless packing (MLP) 430 which outputs latent mapping functions 434 the transformation parameters of linear transformation to obtain different latent code vectors 436. The decoder of sampling architecture 420 is the frame prediction model of the prediction model architecture 400 of FIG. 4A. The decoder 438 is conditioned based on the features of the previous input frame obtained by using skip connections 440.

Each of the obtained latent code vectors 436 is fed into the frame prediction model with skip connections 440 from the intermediate layers to generate the output a predicted frame 442 given by., $x^i = f_\theta(z^i, h_{t-1})$ such that $i \in \{1, 2, \ldots, K\}$. Each individual branch outputs parameters of a linear transformation, which are used to obtain a different latent code vector $z^i$, i.e., $z^i = \tau_{\psi_i}(\epsilon)$ such that $i \in \{1, 2, \ldots, K\}$. Here $\tau_{\psi_1}, \ldots, \tau_{\psi_K}$ denote latent mapping functions with parameters $\psi = \{\psi_1, \ldots, \psi_K\}$. Here, h denotes intermediate feature maps and t denotes time steps. Then, a joint distribution for the model may be defined as follows:

$r_\psi(X, Z|h_{t-1}) = p_\theta(X|Z, h_{t-1})r_\psi(Z|h_{t-1})$ where $p_\theta(X, Z|h_{t-1})$ is the conditional distribution induced by the generator $f_\theta(Z, h_{t-1})$. Here, $r_\psi(X, Z|h_{t-1})$ may only rely on $\psi$ as the parameters of the generator model $\theta$ are already learned and may be kept frozen.

In order to produce a diverse set of samples, p(X) may be a prior that encourages diversity according to:

$$\min_\psi -\mathbb{E}_{x \sim r_\psi}(X|h_{t-1})[\log p(X)] + \beta \sum_{i=1}^{K} D_{KL}(r_\psi(z^i|h_{t-1})\|p(z^i))$$

in order to minimize the cross entropy between $r_\psi(X|h_{t-1})$ and the diversity prior p(X). A divergence between $r_\psi(z^i|h_{t-1})$ and the Gaussian prior $p(z^i)$ is used in a way that the model ignores samples with low likelihood. $\beta$ is the Lagrangian multiplier, which compromises a balance between diversity and likelihood. As a result, the objective may be drawn as follows:

$L_{NDLow} = L_{prior} + \beta L_{KL}$ where $L_{prior}$ encourages the diversity of samples X and $L_{KL}$ is the KL loss that escalates the likelihood of the samples.

An invertible linear transformation is given by:

$$\tau_{\psi_i}(\epsilon) = \sum_i^{\frac{1}{2}}(h_{t-1})\epsilon + \mu_i(h_{t-1}), i = 1, \ldots K$$

put parameters from $Q_\psi$ of the sampling architecture 420. The invertible linear transformation $\tau_{\psi_i}$ has the advantage that $r_\psi(z^i|h_{t-1})$ distribution becomes a Gaussian distribution $\mathcal{N}(\mu_i, \Sigma_i)$ which results the KL loss $D_{KL}(r_\psi(z^i|h_{t-1})\|p(z^i))$ to be tractable and have a closed form.

The normalized distance metric preserves distance of samples in the latent space to the output space, such as the image space. For example, using $L_{prior}$, the pairwise normalized distance of samples is preserved in the latent space as similar as that in the output space. To do so, the $L_{prior}$ objective may be advanced as follows:

$L_{prior} = -L_d(X, Z) + \lambda_r L_r(X)$ where $L_d$ is the diversity loss and $L_r$ is the reconstruction loss. This modification encourages the sampling architecture 420 to produce more diverse samples while preserving the quality of predictions. The produced samples may be the plurality of frames for the future time such as the third time. The normalized distance regularizer enhances the sampling capability. Let $D_{ij}$ be the normalized distance between a pair of data points $x^i, x^j \in X$. $D_{ij}$ may be measured by any normalized distance metrics. In one embodiment, Euclidean space may be used. For example, $$D_{ij} = \frac{\|x^i - x^j\|_2}{\sum_j \|x^i - x^j\|_2},$$

where $\|\cdot\|_2$ is a Euclidean norm. The likelihood of each pair of latent code samples $z^i$ and $z^j$ may be represented as:

$$p(Z|X) = \prod_i^K \prod_{j \neq i}^K p(z^i, z^j | D_{ij})$$

$$p(z^i, z^j | D_{ij}) = \frac{1}{S} \exp^{-E(z^i, z^j | D_{ij})}$$

$$E(z^i, z^j | D_{ij}) = \frac{(\|z^i - z^j\|_2 - D_{ij})^2}{2\tau^2}$$

where E is the energy function. The normalizing factor S may be dropped. As a result, the diversity loss is given by:

$$L_d = \frac{1}{K^2 - K} \sum_i \sum_{j \neq i} \left( -\frac{(\|z^i - z^j\|_2 - D_{ij})^2}{2\tau^2} \right)$$

The second term of $L_{prior}$ is the reconstruction loss $L_r$ which is computed as follows:

$$L_r(X) = \frac{1}{K} \sum_{i=1}^{K} d(x^i, \hat{x})$$

Using $L_{prior}$, the network parameters of the encoder are updated in a way that the size of more likely mode is being shrank while less likely samples are being collapsed into a mode. As a result, our sampler with $L_{KL}$ becomes more effective in learning the mappings functions, eventually generating more diverse predictions from both major and minor modes.

At block 310, the method 300 includes the sampling module 122 selecting one or more candidate frames from the plurality of future frames. In one embodiment the plurality of future frames may be classified based on a number of classifications or labels. For example, if the first frame includes a proximate agent 206 having a turning signal illuminated, candidate frames in which the proximate agent is turning may be selected from the plurality of future frames for a third time.

The plurality of future frames may also be classified by a number of predictors. For example, in the vehicular embodiment, a CNN extractor may identify a number of features in the first frame and the second frame configured to perform inferences in the models and modules described above with respect to FIG. 1 and FIG. 4 to extract predictors (e.g., signage from the roadway 200, illuminated lights of roadway infrastructure, illuminated lights of proximate vehicles, obstacles, roadway markings) of the behavior of the proximate agent 206.

Figure 5:
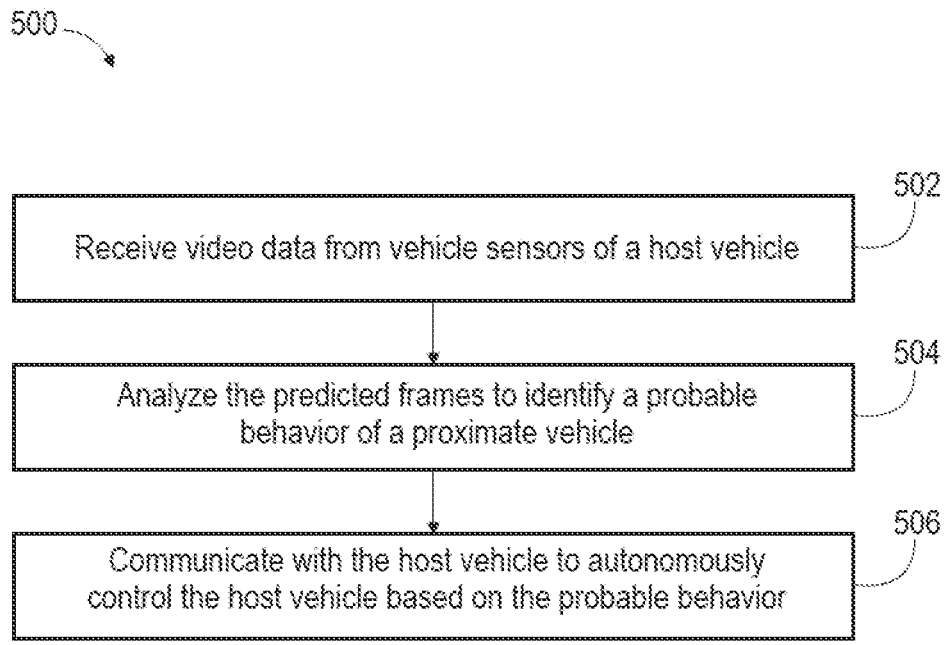
FIG. 5 is a process flow diagram of a method for controlling the vehicle to be autonomously driven based on the predicted dataset according to an exemplary embodiment.

Referring now to FIG. 5, a method 500 for predicting future data using diverse sampling will now be described according to an exemplary embodiment. FIG. 5 will be described with reference to the components of FIG. 1, though it is to be appreciated that the method of FIG. 5 may be used with other systems and/or components.

At block 502, the method 500 includes receiving vehicle dynamic data and image data to select one or more candidate frames from a plurality of future frames based on the normalized metric in the manner described above with regard to block 308 of the method 300. The vehicle dynamic data may include the speed, direction, and planned path, among other kinematic characteristics of the host agent 202 and/or the proximate agent 206.

At block 504, the method 500 includes analyzing the one or more candidate frames and the vehicle dynamic data to identify a probable behavior of a proximate agent 206. The probable behavior may include a driving action, a turn signal operation, a steering operation, a braking operation, an acceleration operation, a horn operation, etc. of the proximate agent 206. For example, the analyzing the vehicle dynamic data and the image data to detect a plurality of behavioral events. A probably behavior of the proximate agent 206 may be identified based on a number of labels and classes of the one or more candidate frames. Continuing the example from above, if the proximate agent 206 has an illuminated turn signal in the one or more candidate frames and the dynamic vehicle data indicates that the proximate agent 206 is slowing, the probable behavior of the proximate agent 206 may be a turn.

At block 506, the method 500 includes controlling the host agent 202 to be autonomously driven based on the probable behavior of a proximate agent 206. In one embodiment, the host agent 202 may broadcast or transmit a communication to the proximate agent 206 via the network 128. The communication may be a V2V message broadcast at a frequency and include information regarding the path planning of the host agent 202. The communication may be broadcast or transmitted without any manual user or driver intervention from the driver of the host agent 202 to start or stop the transmission of the V2V messages and/or associated information.

In another embodiment, the operational systems 106 and/or the execution module 126 may cause the host agent 202 react with a driving reaction in response to the probable behavior. In the vehicular embodiment, the operational systems 106 may communicate with vehicle systems to cause the host agent 202 to engage in a driving actions, such as a turn signal operation, a steering operation, a braking operation, an acceleration operation, a horn operation, etc. Accordingly, the host agent 202 may act after having received a diverse set of predicted frames corresponding to a third time. By operating with the full understanding of possibilities proffered in the diverse set of predicted frames, the host agent 202 is controlled based on a more informed decision.

A two-stage method for generating diverse future frames has been described. In the training stage, we train a prediction model architecture 400 and tackle the posterior collapse problem by lagging the prediction model. In the sampling stage, instead of drawing independent random samples from the learned latent codes, a more advanced sampling method with the sampling architecture 420 which uses a learnable linear transformation network which enables sampling from latent space more efficient by covering more modes in the data distribution and keeping the distance between drawn samples in the latent space, thereby generating a diverse set of predicted frames as the plurality of future frames.

Figure 6:
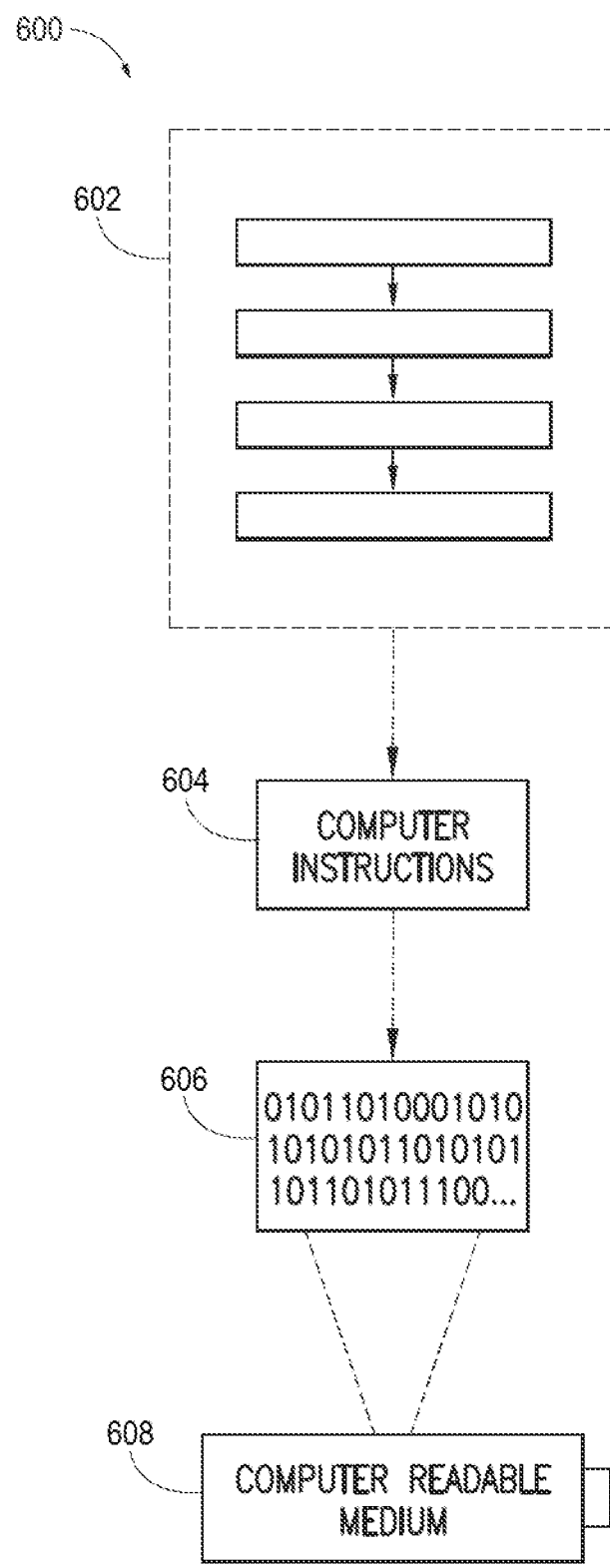
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein.

In this implementation 600, the processor-executable computer instructions 604 may be configured to perform a method 602, such as the method 300 of FIG. 3 or the method 500 of FIG. 5. In another aspect, the processor-executable computer instructions 604 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
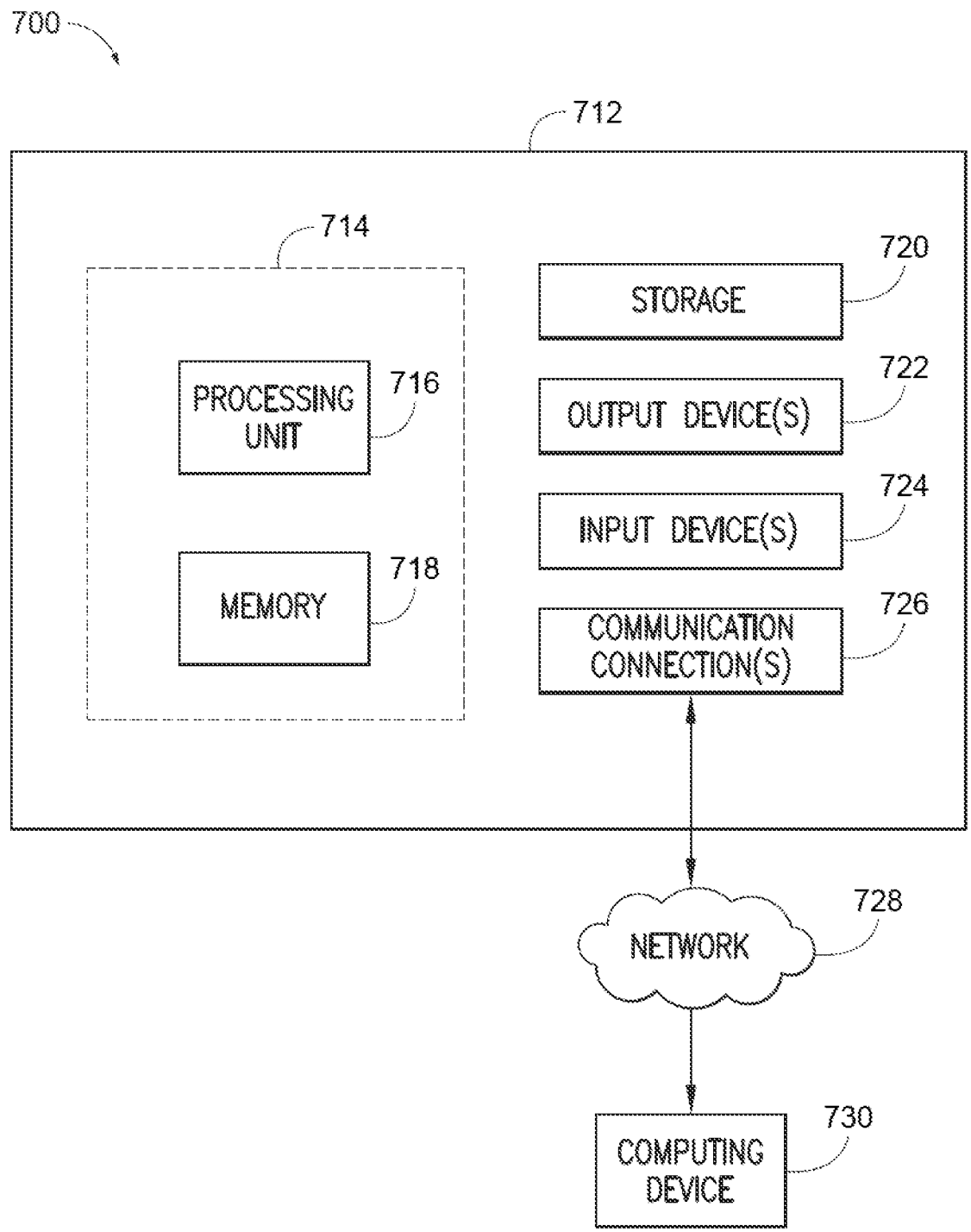
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions is combined or distributed as desired in various environments.

FIG. 7 illustrates a system 700 including an apparatus 712 configured to implement one aspect provided herein. In one configuration, the apparatus 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the apparatus 712 includes additional features or functionality. For example, the apparatus 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the apparatus 712. Any such computer storage media is part of the apparatus 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The apparatus 712 includes input device(s) 724 such as keyboard, mouse, pen, voice input device, touch input device, infrared cameras, video input devices, or any other input device. Output device(s) 722 such as one or more displays, speakers, printers, or any other output device may be included with the apparatus 712. Input device(s) 724 and output device(s) 722 may be connected to the apparatus 712 via a wired connection, wireless connection, or any combination thereof. In one aspect, an input device or an output device from another computing device may be used as input device(s) 724 or output device(s) 722 for the apparatus 712. The apparatus 712 may include communication connection(s) 726 to facilitate communications with one or more other devices 730, such as through network 728, for example.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for predicting future frames, the computer-implemented method comprising:
   receiving a video having a first frame from a first time and a second frame from a second time after the first time, wherein the first frame and the second frame are represented in an image space;
   repeatedly updating a frame prediction model based on the video until a stopping condition is satisfied, wherein the stopping condition is based on information from a latent code of the frame prediction model and an input image;
   determining whether the stopping condition is satisfied;
   in response to determining that the stopping condition has been satisfied, generating a plurality of future frames for a third time after the second time, wherein the plurality of future frames is generated using the frame prediction model based on a normalized distance metric that preserves distance of samples in a latent space of the frame prediction model to the image space; and
   selecting a candidate frame from the plurality of future frames.

2. The computer-implemented method of claim 1, wherein updating the frame prediction model occurs in a training stage before the stopping condition is satisfied.

3. The computer-implemented method of claim 1, wherein generating the plurality of future frames for the third time occurs in a sampling stage after the stopping condition is satisfied.

4. The computer-implemented method of claim 1, wherein updating the frame prediction model is based on an aggressive training wherein the frame prediction model receives learning model parameters.

5. The computer-implemented method of claim 4, wherein in response to determining that the stopping condition has been satisfied, the method further comprises reverting the updating to a standard training.

6. The computer-implemented method of claim 5, wherein the standard training causes the frame prediction model to receive the learning model parameters faster than the aggressive training.

7. The computer-implemented method of claim 1, further comprising:
   identifying a probable behavior of a proximate agent based on the candidate frame; and
   communicating with a host agent to control the host agent based on the probable behavior of the proximate agent.

8. A system for predicting future frames, comprising:
   a memory storing instructions that when executed by a processor cause the processor to:
   receive a video having a first frame from a first time and a second frame from a second time after the first time, wherein the first frame and the second frame are represented in an image space;
   repeatedly update a frame prediction model based on the video until a stopping condition is satisfied, wherein the stopping condition is based on information from a latent code of the frame prediction model and an input image;
   determine whether the stopping condition is satisfied;
   in response to determining that the stopping condition has been satisfied, generate a plurality of future frames for a third time after the second time, wherein the plurality of future frames is generated using the frame prediction model based on a normalized distance metric that preserves distance of samples in a latent space of the frame prediction model to the image space; and
   select a candidate frame from the plurality of future frames.

9. The system of claim 8, wherein updating the frame prediction model occurs in a training stage before the stopping condition is satisfied.

10. The system of claim 8, wherein generating the plurality of future frames for the third time occurs in a sampling stage after the stopping condition is satisfied.

11. The system of claim 8, wherein updating the frame prediction model is based on an aggressive training wherein the frame prediction model receives learning model parameters.

12. The system of claim 11, wherein determining that the stopping condition has been satisfied, further causes the frame prediction model to revert to a standard training.

13. The system of claim 12, wherein the standard training causes the frame prediction model to receive the learning model parameters faster than the aggressive training.

14. The system of claim 8, wherein the instructions that when executed by the processor, further cause the processor to:
   identify a probable behavior of a proximate agent based on the candidate frame; and
   communicate with a host agent to control the host agent based on the probable behavior of the proximate agent.

15. A non-transitory computer readable storage medium storing instructions that when executed by a computer having a processor, causes the processor to perform a method for predicting future frames, the method comprising:
   receiving a video having a first frame from a first time and a second frame from a second time after the first time, wherein the first frame and the second frame are represented in an image space;
   repeatedly updating a frame prediction model based on the video until a stopping condition is satisfied, wherein the stopping condition is based on information from a latent code of the frame prediction model and an input image;

determining whether the stopping condition is satisfied;

in response to determining that the stopping condition has been satisfied, generating a plurality of future frames for a third time after the second time, wherein the plurality of future frames is generated using the frame prediction model based on a normalized distance metric that preserves distance of samples in a latent space of the frame prediction model to the image space; and selecting a candidate frame from the plurality of future frames.

16. The non-transitory computer readable storage medium of claim 15, wherein updating the frame prediction model occurs in a training stage before the stopping condition is satisfied.

17. The non-transitory computer readable storage medium of claim 15, wherein generating the plurality of future frames for the third time occurs in a sampling stage after the stopping condition is satisfied.

18. The non-transitory computer readable storage medium of claim 15, wherein updating the frame prediction model is based on an aggressive training wherein the frame prediction model receives learning model parameters.

19. The non-transitory computer readable storage medium of claim 18, wherein determining that the stopping condition has been satisfied, further causes the frame prediction model to revert to a standard training.

20. The non-transitory computer readable storage medium of claim 19, wherein the standard training causes the frame prediction model to receive the learning model parameters faster than the aggressive training.

* * * * *